United States Patent [19]

Thong

[11] Patent Number: 4,635,098

[45] Date of Patent: Jan. 6, 1987

[54] METHOD AND SYSTEM FOR IMPROVED RECONSTRUCTION OF VIDEO IMAGES IN LINE SEQUENTIAL CHROMA FORMAT

[75] Inventor: Tran Thong, Beaverton, Oreg.

[73] Assignee: Tektronix, Inc., Beaverton, Oreg.

[21] Appl. No.: 569,434

[22] Filed: Jan. 9, 1984

[51] Int. Cl.$^4$ ............................................. H04N 11/18
[52] U.S. Cl. ....................................................... 358/14
[58] Field of Search ........................ 358/11, 12, 13, 14

[56] References Cited

U.S. PATENT DOCUMENTS

| | | | |
|---|---|---|---|
| 3,781,463 | 12/1973 | Van den Bussche | 358/310 |
| 4,051,516 | 9/1977 | Weston | 358/11 |
| 4,245,235 | 1/1981 | Poetsch | 358/14 |
| 4,335,393 | 6/1982 | Pearson | 358/11 |
| 4,516,151 | 5/1985 | Stahler | 358/12 |

FOREIGN PATENT DOCUMENTS

| | | | |
|---|---|---|---|
| 124222 | 11/1984 | European Pat. Off. | 358/14 |
| 2258569 | 6/1974 | Fed. Rep. of Germany | 358/14 |
| 2059712 | 4/1981 | United Kingdom | 358/11 |

OTHER PUBLICATIONS

Broder Wendland, High Definition Television Studies on Compatible Basis with Present Standard, Television Technology in the 80s, SMPTE, pp. 151-165, 1981.

G. Tonge et al, Line Sequential Color Transmission and Vertical Filtering in MAC, IBA, GT V1 EVSS 114.

*Primary Examiner*—John W. Shepperd
*Attorney, Agent, or Firm*—William A. Birdwell; John Smith-Hill; Robert S. Hulse

[57] ABSTRACT

A method and system for reconstruction of chroma component segments in a line sequential chroma format television system. Filtering of a received line sequential chroma signal is employed to reconstruct missing chroma components and to attenuate phantom frequency components greater than one half the spatial sampling rate. Digital and analog filters are disclosed for implementation of such post filtering. The luminance component of the line sequential signal is delayed at the transmitter to synchronize the reconstructed chroma segment with its corresponding luminance segment with the use of minimal hardware at the receiver. Horizontal offset chroma sampling is used along with such post filtering to decrease transmission bandwidth requirements without sacrificing horizontal resolution at the receiver.

30 Claims, 18 Drawing Figures

METHOD AND SYSTEM FOR IMPROVED RECONSTRUCTION OF VIDEO IMAGES IN LINE SEQUENTIAL CHROMA FORMAT

BACKGROUND OF THE INVENTION

This invention relates to television signal processing, in particular to the reduction of distortion of video images transmitted in line sequential chroma format.

As a result of recent advances in digital electronics that permit a greater variety of video image modifications, the television industry has experienced a need for an increased number of editing passes of a television signal to implement such modifications. Since present signals, based on the method of frequency multiplexing adopted by the National Television System Committee (NTSC) in 1953, suffer noticeable degradation after a few video tape transfers, there is a need for alternative coding methods less subject to distortion by such processing. While a higher quality signal less subject to such degradation could be provided with increased bandwidth, there is, at the same time, a need to maintain the signal within the existing bandwidth in order to continue to utilize existing transmission equipment, and to minimize technical complexity and expense. It is therefore desirable to code the signal so as to make maximum use of the available bandwidth with minimal visually perceptible degradation in the video image.

One approach to this problem is to use a line sequential chroma format. In this format, the video signal, which comprises a luminance (intensity) component (Y), a first chrominance or "chroma" (color) component ($C_1$), and a second chroma component ($C_2$), is transmitted so that for each horizontal line of the television raster, only one of the two chroma components is transmitted with the associated luminance component, each chroma component being transmitted alternately with respective segments of the luminance component. Thus, for example, a first luminance segment $Y_1$, corresponding to a first horizontal line, would be accompanied by a segment of a first chroma component $C_{11}$; a second luminance segment $Y_2$, corresponding to a second horizontal line, would be accompanied by a segment of a second chroma component $C_{22}$; a third luminance segment $Y_3$, corresponding to a third horizontal line, would be accompanied by a segment of the first chroma component $C_{13}$; a fourth luminance segment signal $Y_4$ would be accompanied by a segment of the second chroma component $C_{24}$; and so on. Thus, one of the two chroma components for every other line is deleted.

In order to have a complete picture displayed at the receiving end, the deletion of every other segment of each chroma component must be accommodated. The necessity for, and manner of, accommodation is dependent upon the manner in which the line sequential signal is transmitted, which may be by frequency multiplexing or time division multiplexing.

An example of a frequency multiplexed line sequential color transmission system is the SECAM (SEquential Couleurs A Memoire) system used in France, L. E. Weaver, *The SECAM Color Television System* (Tektronix, Inc., 1982). Because the chroma sequence in SECAM spans two frames the human eye will average the consecutive chroma signals to get the right color. However, such a system introduces perceptible and visually undesirable frame flicker.

Another approach is exemplified by a "time compressed color component" (TC3) system employing time division multiplexing. In this system the two chroma components are compressed in time and transmitted alternately before a corresponding segment of the luminance component. At the receiving end the missing chroma segments are reconstructed by simply inserting the corresponding chroma segment for the previous horizontal line. A system of this type has been described in Charles W. Rhodes, "Time Division Multiplex of Time Compressed Chrominance for a Compatible High Definition Television System," *Proceedings of the International Conference on Consumer Electronics*, Chicago, Ill., June 11, 1982. A similar system known as the multiplexed analogue component method has been described in K. Lucas and M. A. Windram, *Direct Television Broadcasts by Satellite Desirability of a New Transmission Standard*, Independent Broadcasting Authority Report 116/81 (IBA, Crawley Court, Winchester, Hants, SO21 2QA, United Kingdom).

One problem resulting from the use of line sequential chroma format is that the chroma signal contains spatial frequency components at frequencies greater than one-half the vertical spatial sampling rate. This produces aliasing which materializes as visually perceptible, and undesirable, distortion in the video picture. It has been recognized that this problem can be overcome by prefiltering the video signal to eliminate frequencies greater than one-half the line sequential chroma sampling rate. Rhodes paper, supra. Nevertheless reconstruction of the missing chroma segments at the receiver results in the generation of phantom high frequency components which produce undesirable visual artifacts. There is therefore a need to reconstruct the chroma segments without the artifacts produced in a time division multiplexed line sequential system and without the undesirable flicker produced in a frequency multiplexed system.

Another problem raised by the use of a line sequential system is that such a system tends to increase the complexity of the transmission and reception apparatus. It would be desirable to implement such a system with minimal complexity at the receiver, which is typically a consumer component, particularly for use in direct satellite broadcast systems which would employ converters connected to existing television receivers.

A further approach to the reduction of bandwidth in a television system is the use of two dimensional sampling. For example, the use of horizontal offset sampling in high definition television has been described in Broder Wendland, "High Definition Television Studies on Compatible Basis With Present Standards," *Television Technology in the 80's* (Society of Motion Pictures and Television Engineers, 1981).

It has been found that in horizontal sampling systems increased horizontal resolution can be achieved by using offset sampling, that is, where the samples in each consecutive horizontal line are offset horizontally from their predecessor. While it would be desirable to use horizontal offset sampling in connection with a line sequential chroma format, sampling in the horizontal dimension produces the same problems of aliasing and reconstruction as is produced by sampling in the vertical dimension.

SUMMARY OF THE INVENTION

The present invention meets the aforementioned need for reconstruction of missing chroma component segments in video line sequential signal format without introducing significant phantom frequency components and their accompanying undesirable visual artifacts. The invention also provides for offset horizontal sampling without the introduction at the receiver of undesirable visual artifacts. In addition, the invention provides a practical approach to achieving these ends while minimizing the complexity of the receiver apparatus.

In the method of the present invention the missing chroma segment is reconstructed by interpolation employing chroma component samples occurring before and after the missing segment. More specifically, the method employs at least two spatially separated samples of a chroma signal to reconstruct a chroma component segment spatially disposed between them by filtering the received signal to reconstruct the segment and to attenuate spatial frequencies greater than one-half the frequency of spatial sampling. In the simplest form linear interpolation between the chroma samples before and after the missing segment is employed.

The method of the invention may be used in only one dimension for vertical sampling, or in both the vertical and horizontal dimensions where horizontal sampling is also used, and may be used with offset horizontal sampling.

The system of the invention employs a digital or analog filter, depending upon the nature of the line sequential signal, for producing from at least two spatially separated samples of a chroma portion of the line sequential signal, a weighted sum of those samples, and a switch for synchronizing the weighted sum with a corresponding segment of the luminance portion to insert the weighted sum as the missing chroma segment. A more complex, two dimensional filter and switching circuit is used to achieve an analogous result where horizontal offset sampling is employed.

In order to reduce complexity at the receiver while permitting reconstruction using a chroma sample corresponding to a horizontal line occurring temporally after the horizontal line having the missing chroma as well as the chroma signal occurring before, the luminance component is delayed relative to one or more successive chroma samples prior to transmission. This eliminates the need for delay of the luminance component at the receiver, which would otherwise add to receiver complexity and unnecessarily multiply the total amount of equipment needed to implement the system.

Accordingly, it is a principal objective of the present invention to provide a novel method and system for improved reconstruction of video images in line sequential chroma format.

It is another objective of the invention to employ at least two spatially separated samples of a chroma component to reconstruct a chroma component segment spatially disposed between them by filtering the resultant signal to reconstruct the segment and to attenuate spatial frequencies greater than one-half the frequency of spatial sampling.

It is a further objective of the invention to provide two dimensional filtering for reconstruction of segments of a chroma component sampled in two respective dimensions.

It is another objective of the invention to provide an image processing method for reconstruction of missing chroma segments without the introduction of significant phantom spatial frequency components.

It is yet another objective of the present invention to provide a system for producing a missing chroma component segment from a weighted sum of chroma component samples and introducing the sum as the missing segment.

It is a further objective of the present invention to reconstruct multiple missing chroma component segments in a multi-dimension sampling system.

It is yet a further objective of the present invention to provide a line sequential chroma television system that minimizes complexity of the receiver.

The foregoing and other objectives, features, and advantages of the present invention will be more readily understood upon consideration of the following detailed description of the invention, taken in conjunction with the accompanying drawings.

DETAILED DESCRIPTION OF THE INVENTION

The method and system of the present invention may be employed with a line sequential chroma format video signal, regardless of the modulation technique. It requires only that the received signal be demodulated, and demultiplexed, to separate the luminance (Y) and two chroma components, C1 and C2, from one another. Thus, for example, it may be employed with a frequency multiplexed system, like SECAM, or a time division multiplexed system, such as either TC3 or MAC. It may be employed in a digital or in an analog system. However, for purposes of illustration of the application of a preferred embodiment of the invention, the TC3 system is employed herein.

Figure 1:
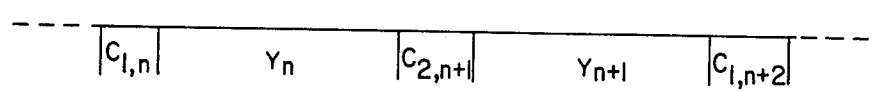
FIG. 1 illustrates an exemplary line sequential chroma television signal known as "time compressed color component" (TC3).

A portion of a time compressed chroma, time division multiplexed, TC3 signal is shown in FIG. 1. In that signal only one of the two required chroma components is sent for each horizontal raster line along with the corresponding luminance component. In TC3 one chroma component for one horizontal line $C_{1,n}$ is sent followed by its corresponding luminance component $Y_n$, then the other chroma component for the next line $C_{2,n+1}$ is sent, followed by its corresponding luminance component $Y_{n+1}$, and so on. The chroma components are time compressed so that the transmission of both the chroma and luminance components fits within the 63.5 microsecond period required for transmission of one horizontal line. (In MAC both the chroma and luminance components are time compressed, while in SECAM compression is unnecessary as the signals are frequency multiplexed.)

The video signal itself can be viewed as an electrical analog of a spatially sampled image, each horizontal line comprising a sample, in the vertical dimension of the image, each sampling having a luminance and two chroma components. The number of samples per unit distance in the dimension of sampling defines the spatial sampling frequency or rate. Thus, by deleting every other chroma sample for each chroma component to produce a line sequential format the spatial sampling rate of the chroma signal is cut in half. (Similarly, as explained later herein, horizontal sampling of the chroma components is equivalent to spatial sampling of the image in the horizontal direction.)

Figure 2A:
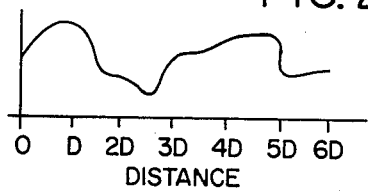
FIGS. 2(a)–(i) illustrate, in the time and frequency domains, the effect of line sequential chroma coding on an original video signal and the result of chroma reconstruction according to the present invention.
Figure 2B:
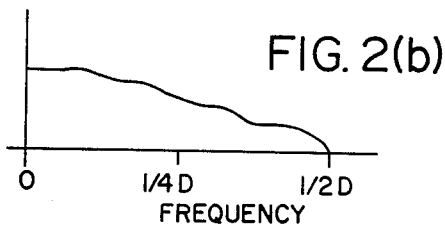

The effect of converting a video signal to line sequential format and the effect of implementation of the present invention are explained with reference to FIGS. 2(a)-(i). A chroma component of an original video signal is illustrated in FIG. 2(a) in the spatial domain, the vertical axis representing amplitude, and the horizontal axis representing distance D in the vertical dimension. FIG. 2(b) illustrates the same chroma component in the frequency domain, the vertical axis representing amplitude, and the horizontal axis representing spatial frequency. For a TC3 system this can be viewed as the chroma component after time compression has occurred.

Figure 2C:
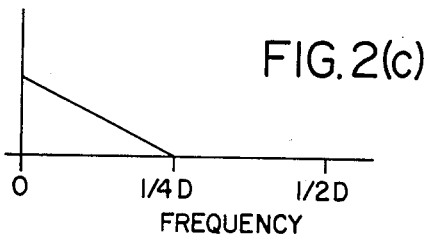

Since the spatial frequency in the vertical dimension of the chroma component of the video signal is 1/2D, the vertical sampling rate must, according to the sampling theorem, be at least 1/D. Since elimination of every other chroma sample for each chroma component cuts the sampling rate in half, the spatial bandwidth of the chroma signal must first be reduced by a factor of one-half in order to prevent aliasing, that is, the generation of a false representation of the visual image due to the presence of spatial frequency components greater than one-half the spatial sampling rate. This is accomplished by prefiltering each chroma component prior to generating the line sequential format. FIG. 2(c) illustrates an exemplary frequency spectrum for one chroma component after such prefiltering.

Figure 2D:
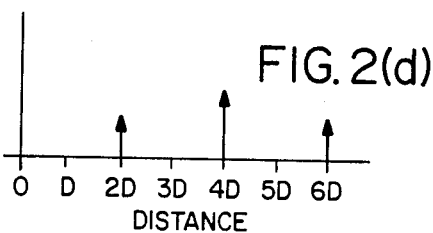
Figure 2E:
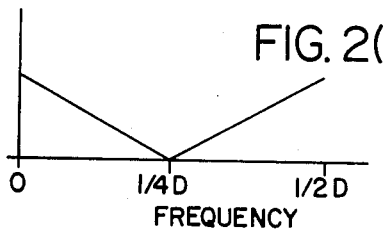

FIG. 2(d) illustrates, in the spatial domain, a chroma component sampled along the vertical dimension, each sample ideally representing an impulse. It can readily be shown that modulation of a signal having a spatial frequency characteristic as shown in FIG. 2(c) by sampling as shown in FIG. 2(d) would result in the generation of phantom spatial frequency components greater than those in the original signal, as illustrated by FIG. 2(e).

Figure 2F:
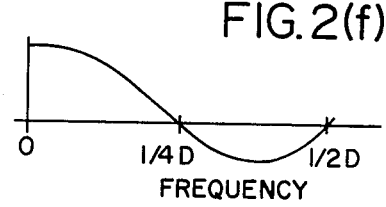
Figure 2G:
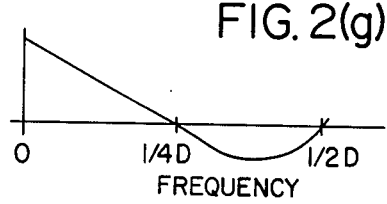

Heretofore, line sequential chroma format has been displayed by simply inserting the chroma component segment for the previous horizontal line, analogous to a sample and zero order hold system. A zero order hold system has a characteristic frequency response of (SIN X)/X, with zero crossing at X=1/4D, as shown in FIG. 2(f). Consequently, when the signal having a frequency spectrum represented by FIG. 2(e) is processed by a zero order hold system the resulting spectrum includes phantom frequency components as shown in FIG. 2(g). These phantom frequency components produce distortion artifacts in the display image.

Figure 2H:
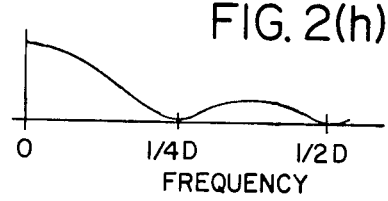
Figure 2I:
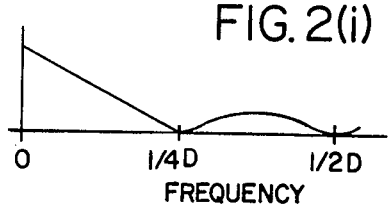

In the present invention the missing chroma segment is reconstructed and phantom frequency components are attenuated by post filtering, that is, filtering of the line sequential chroma signal after it has been received. In the simplest case an averaging filter, having a characteristic frequency response of $((SIN X)/X)^2$, is used, as illustrated by FIG. 2(h). This is equivalent to linear interpolation, or finding the average, between the chroma component samples preceding and following the line for which a chroma component segment is missing. The frequency spectrum resulting from filtering a signal illustrated by FIG. 2(e) with a filter having the characteristics of FIG. 2(h) is a signal whose frequency components greater than one-half the spatial sampling rate are greatly attenuated, as illustrated by FIG. 2(i). The invention comprehends the concept of employing more complex post filtering to obtain greater attenuation of phantom frequency components for even better results.

Figure 3A:
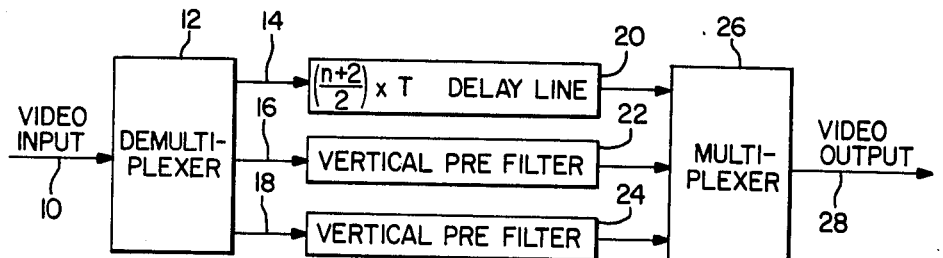
FIGS. 3(a)–(c) illustrate, diagrammatically, vertical prefiltering systems for implementation of chroma reconstruction according to the present invention.
Figures 4, 5A, 5B:
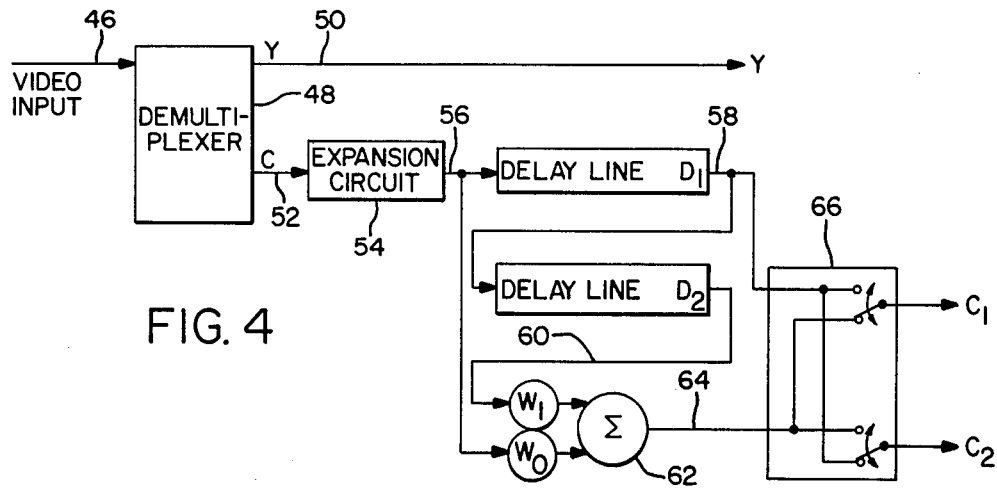
FIG. 4 illustrates a vertical post filter for implementation of chroma reconstruction according to the present invention.
FIGS. 5(a) and (b) illustrate, in a line sequential chroma system, horizontal offset sampling and chroma reconstruction, respectively, according to the present invention.

The method, and a physical system for implementing the method, of the present invention are better understood with reference to FIGS. 3(a) and (c) and FIG. 4. FIG. 3(a) shows a block diagram of a line sequential format transmission system for implementation of a preferred embodiment of the present invention. In the transmission system a conventional video input 10 is accepted by a demultiplexer 12 which separates the video input into a luminance component 14, a first chroma component 16, and a second chroma component 18. For reasons explained below, the luminance component is fed to a delay line 20 in the transmission system. Each chroma component output 16 and 18, is fed to an associated vertically prefilter, 22 and 24 respectively. The outputs of the delay line 20 and two vertical prefilters are fed to a multiplexer 26 which combines them to produce the transmitted video output 28 in line sequential format. It is recognized that the multiplexer could employ either time division or frequency multiplexing without departing from the principles of the invention.

Figure 3B:
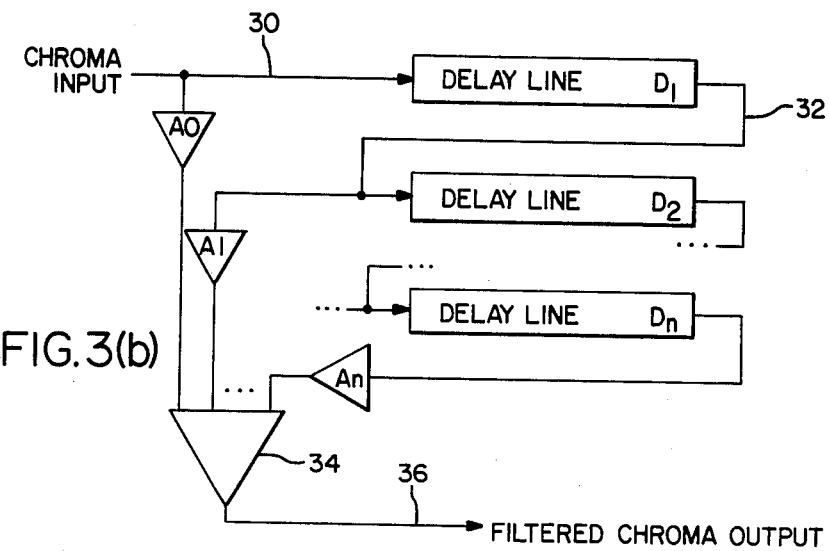

FIG. 3(b) illustrates a chroma component vertical prefilter for an analog system. In this filter a chroma component input 30 is fed to a first delay line $D_1$ and to a first amplifier $A_0$, the output 32 of the first delay line is fed to the input of a second delay line $D_2$ and to the input of a second amplifier $A_1$, and so on up to n delay lines and n+1 amplifiers. Outputs from each of the amplifiers $A_0$-$A_n$ are fed to a summing junction 34 where they are added together to produce a filtered chroma signal output 36. The delay lines $D_1$-$D_n$ may be constructed from commonly known devices such as charge coupled devices, glass delay lines, and the like, the amplifiers $A_0$-$A_n$ may be commonly known current amplifiers, and the summing junction may be constructed in a variety of commonly known ways. The number of delay lines and amplifiers is a function of the complexity of the filtering which is desired. In a practical implementation, n would be even.

For each delay introduced by a filter, there must be a corresponding delay introduced in thhe luminance signal by the delay line 20, each delay line introducing a time delay equivalent to the time T required to transmit a single horizontal line, that is, ordinarily 63.5 micro seconds. Since only one chroma component is sent for each line in line sequential format, the delay may be $(n/2) \times T$; however, for reasons explained below, a delay of $((n+2)/2) \times T$ is preferred.

The sum of the input to, and outputs from, the delay lines $D_1$-$D_n$, weighted by the amplification factors of the amplifiers $A_0$-$A_n$ produces a filtered chroma component output whose frequency components above a predetermined point are attenuated in a desired amount.

Figure 3C:
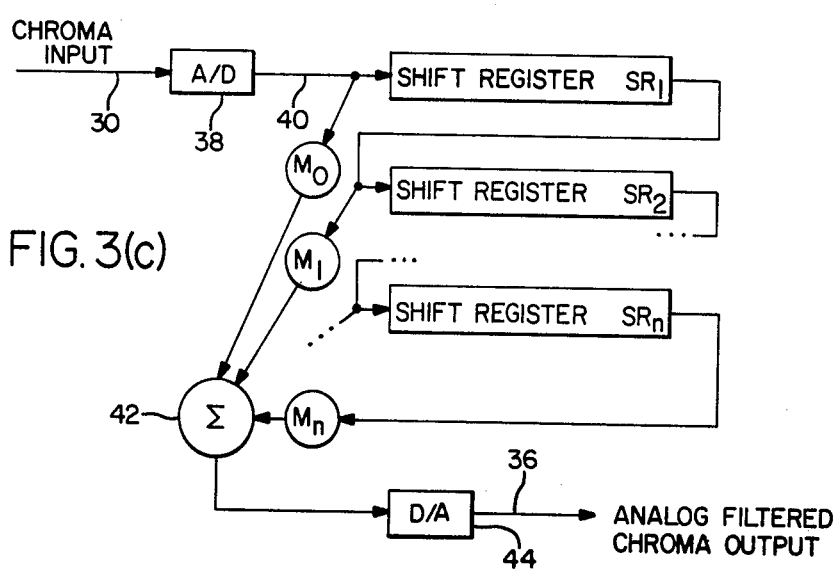

Turning to FIG. 3(c) an identical result may be obtained by a digital implementation employing shift registers $SR_1$-$SR_n$ as delay lines, and multipliers $M_0$-$M_n$ to weight inputs to a digital adder 42. In this case the chroma input 30 is first fed to an analog-to-digital converter 38 which produces a digital representation 40 fed to the first shift register $SR_1$ and the first multiplier $M_0$. The outputs from the shift registers and the input to the first shift register are added in the digital adder 42 and the sum is fed to a digital-to-analog converter 44 to produce the analog filtered chroma output 36. Where the television system is a digital format system in the first place, the analog-to-digital and digital-to-analog converters are unnecessary.

An exemplary illustration of a receiving portion of a line sequential format system employing the present invention is shown in FIG. 4. The received line sequential signal 46 is input to a demultiplexer 48, which separates it into a luminance component 50 and a chrominance signal 52, the chrominance signal alternately providing the first and second chroma components for respective alternate horizontal lines. Assuming that the chroma components have been time compressed at the transmitter to achieve a TC3 or MAC format, the chrominance signal 52 is fed to a fast-in slow-out expansion circuit 54 to provide a real time representation signal 56 of the chroma components.

Reconstruction of the missing chroma segment is accomplished by delaying each chroma component segment for a period of at least two horizontal lines (that is, a total of 127 micro seconds) so that it can be combined, as a weighted sum, with the next transmitted chroma component sample of the same type to produce the chroma component segment disposed spatially between the aforementioned two chroma component samples. The weighted sum is then synchronized with its corresponding luminance component, preferably by delaying the luminance component at the transmitter, and by selecting the output of the weighted sum at the proper time. For this reason, the delay in delay line 20 of FIG. 3(a) is of $((n+2)/2) \times T$, rather than $(n/2) \times T$.

In the specific embodiment shown in FIG. 4 a first delay line D1, whose input is the signal 56, provides an output 58 to a second delay line D2 and to a switch 66. The signal 56 and the output 60 of the second delay line are fed through respective weighting circuits $W_0$ and $W_1$ to a summing circuit 62. Thus, when a chroma sample for one horizontal line, for example $C_{1,n+1}$, is input to the first delay line $D_1$, the chroma sample of the same type for a preceding horizontal line two lines earlier in time, $C_{1,n-1}$, is output from the second delay line $D_2$. By selecting weighting values of one-half for $W_0$ and $W_1$ the output 64 from the summing circuit 62 is the average of the sample $C_{1,n-1}$ and $C_{1,n+1}$, which is inserted as the chroma segment of the same type corresponding to the horizontal line in between, that is $C_{1,n}$. At the same time the output 58 from the first delay line $D_1$ is the real chroma segment of the other type corresponding to the same horizontal line, that is, $C_{2,n}$. One horizontal line after the output 64 from the summing circuit is the missing chroma segment for the second type of chroma signal and the output 58 from the first delay line is the real chroma segment for the first type of chroma component for the same horizontal line.

As part of the synchronization process the switch 66 is provided to select chroma component segments $C_1$ and $C_2$ from the summing circuit output 64 and the delay line output 58. The switch provides two constant chroma outputs $C_{1,n}$ and $C_{2,n}$ from the outputs 64 and 58 whose chroma component types reverse with every horizontal line. In order to synchronize the chroma segments with their corresponding luminance component segment the luminance signal must be delayed one horizontal line. While this could be done at the receiver without departing from the principles of the invention, that would require additional circuitry at each receiver, so it is preferred that the delay be inserted at the transmitter, as shown in FIG. 3(a).

In the foregoing receiving portion of the system the delay line, weighting circuits, and summing circuits, in combination with the switch 66 employ at least two spatially separated samples of a chroma signal to reconstruct a chroma signal segment spatially disposed between the two samples, and the delay line, weighting circuit, and summing circuit act as a filter to attenuate spatial frequencies greater than one-half the frequency of spatial sampling. While only two delay lines have been shown it is recognized that additional delay lines, corresponding weighting, and a commensurate increase in the delay of the luminance signal, could be employed in more complex configuration to achieve greater attenuation of phantom frequency components. It is also recognized that the aforedescribed filter circuit could be of the analog type, similar to that described in FIG. 3(b), or the digital type, similar to that described in FIG. 3(c).

The same basic principle of post filtering of a line sequential chroma signal can be applied to two dimensional spatial sampling as well, that is where the chroma components are sampled in the horizontal as well as the vertical dimension. In this case, rather than sending a continuous chroma component signal for each horizontal line, the chroma component is sampled and either discrete samples are sent (in a digital system) or a reconstructed analog signal is sent. In either case the required bandwidth can be decreased with proper digital filtering and resampling. Moreover, to increase horizontal resolution the chroma samples beyond that which can be inferred by the horizontal sampling process, every other horizontal line are spatially offset from one another, ordinarily half way between one another.

FIG. 5(a) shows a plurality of samples of one chroma component type, that is, $C_1$, taken both horizontally and vertically. Thus, the $C_1$ signal for horizontal line 1 has been sampled at points $C_{111}$, $C_{113}$, $C_{115}$, $C_{117}$, and so on, leaving missing points, or segments, in between, that is, $C_{112}$, $C_{114}$, $C_{116}$, and so on. In the vertical dimension only the other chroma signal, $C_2$, is sampled on horizontal line 2 (not shown). At horizontal line 3, chroma signal $C_1$ is again sampled, but at positions offset horizontally from the positions sampled on horizontal line 1, that is, at points $C_{132}$, $C_{134}$, $C_{136}$, and so on. At horizontal line 5 the $C_1$ signal is again sampled at the original horizontal positions.

Referring to FIG. 5(b) it can be seen that for each chroma type three missing segments must be replaced between the boundary formed by two samples in the vertical dimensions and two samples in the horizontal dimension. For example, the missing segments $C_{123}$, $C_{133}$, and $C_{143}$ must be determined from the samples $C_{113}$, $C_{132}$, $C_{134}$, and $C_{153}$. In the present invention this is accomplished by post-filtering, just as with sampling in the vertical dimension only; however, in this case filtering in both the vertical and horizontal dimensions is required.

Figure 6A:
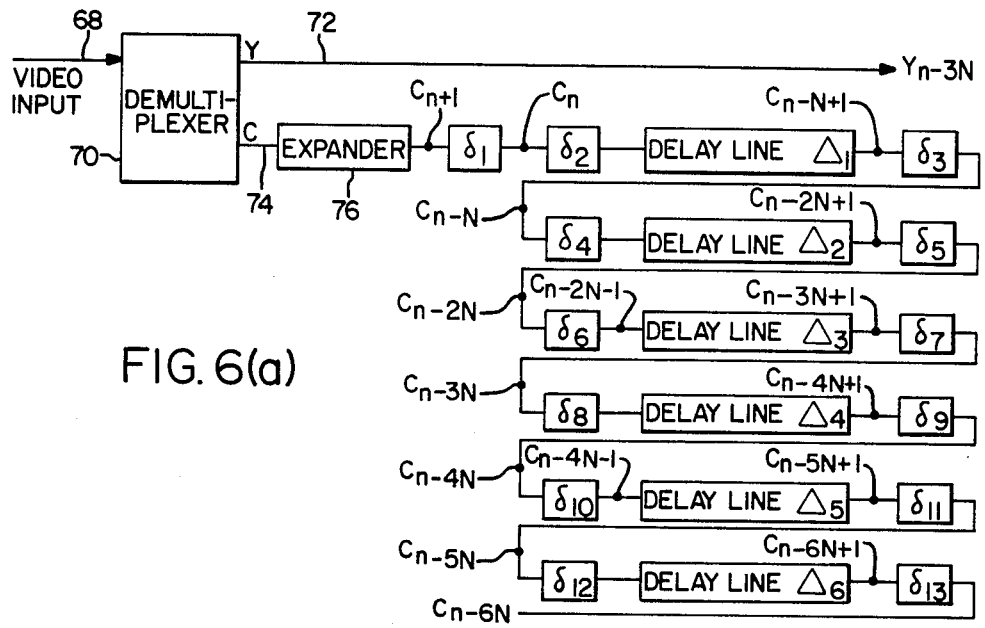
FIGS. 6(a) and (b) illustrate a two dimensional post filter for implementation of chroma reconstruction in a horizontal offset sampling line sequential chroma system according to the present invention.
Figure 6B:
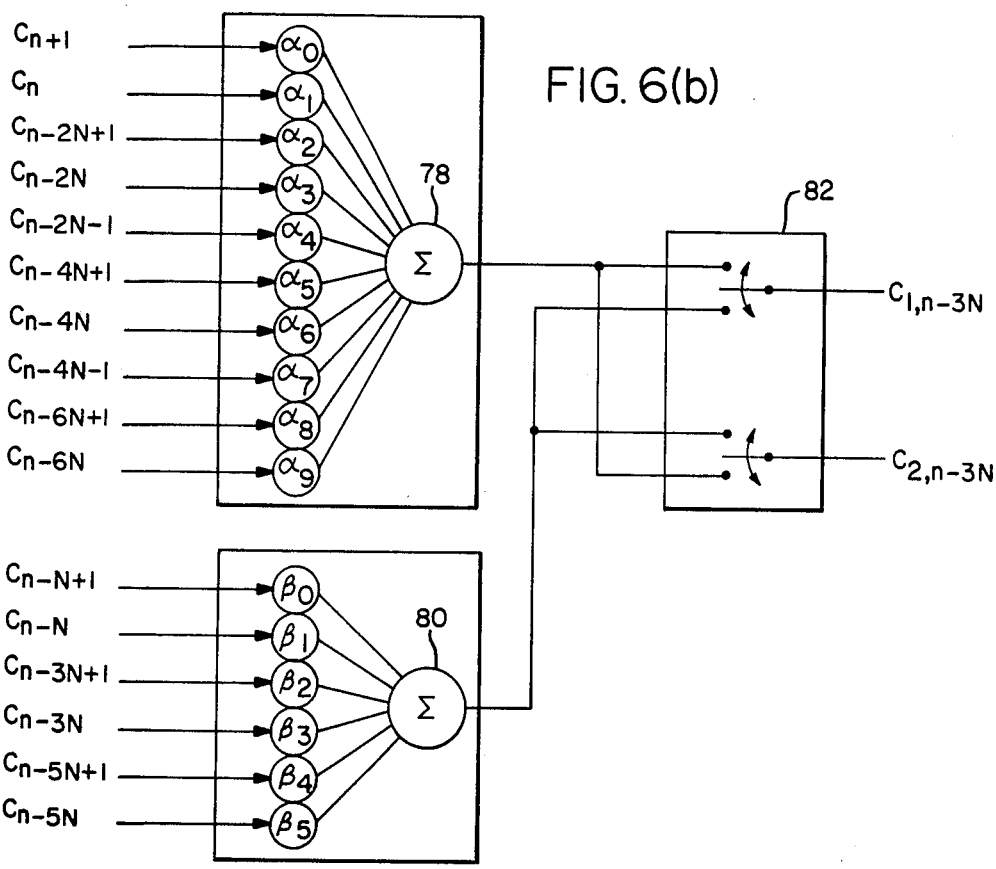

A post-filter for a two dimensional, horizontal offset sampling line sequential system is shown in FIGS. 6(a) and (b). This filter provides linear interpolation in two dimensions. A vertically and horizontally offset sampled line sequential video signal is provided at input 68 to a demultiplexer 70 that provides luminance 72 and chrominance 74 signal outputs. Assuming that time compression has been employed, the output 74 is fed to an expander 76 which produces a real time chrominance signal representing consecutively occurring samples of a chroma components. The output of the expander is fed through a series of delay lines $\delta_{1\text{-}13}$ and $\Delta_{1\text{-}6}$ which make available simultaneously the chroma component samples needed to be combined to produce the missing chroma segments.

In this example, the delay lines $\delta_{1\text{-}13}$ each introduce a delay equal to the period between samples of one chroma component. The delay lines $\Delta_{1\text{-}6}$ each introduce a delay equal to $N \times \delta - 2\delta$, where N=the number of chroma samples in a given horizontal line. Ordinarily, $N \times \delta = 63.5$ microseconds. n designates the number of a reference horizontal line. The current luminance signal being received is designated by $Y_{n-3N}$, the two dimensional, offset sampling system requiring that the chroma samples be sent three lines ahead of their corresponding luminance segments, that is, that the luminance component be delayed three lines at the transmitter.

The signals derived from the delay lines in FIG. 6(a) are weighted by weighting elements $\alpha_0-\Delta_9$ and $\beta_0-\beta_5$ which are added by respective adders 78 and 80. A switch 82 accepts as inputs the outputs from the adders 78 and 80 and reversibly and alternately selects them to produce the outputs $C_{1,n-3N}$ and $C_{2,n-3N}$ which are thereby synchronized with the luminance segment $Y_{n-3N}$.

The terms and expressions which have been employed in the foregoing abstract and specification are used therein as terms of description and not of limitation, and there is no intention of the use of such terms and expressions of excluding equivalents of the features shown and described in the portions thereof, it being recognized that the scope of the invention is defined and limited only by the claims which follow.

I claim:

1. A method of operating a television transmitting and receiving system, comprising:
   generating a first video signal having a luminance portion representing spatial samples at line frequency of a luminance componant and a chrominance portion representing spatial samples at line frequency of at least one chrominance component, the luminance samples occurring in a succession of time slots and the chrominance samples occurring in the same time slots as corresponding luminance samples,
   generating a video signal in line sequential chroma format and having a luminance portion and a chrominance portion, by filtering the chrominance portion of the first video signal to attenuate spatial frequencies greater than one-half of a selected submultiple of line frequency, delaying the luminance portion of the first video signal relative to the chrominance portion thereof by an interval equal to the duration of at least one time slot, selecting samples of said one chrominance component at said selected submultiple of line frequency, and multiplexing the selected chrominance samples with the luminance samples, so that samples of said one chrominance component other than the selected chrominance samples are omitted from the line sequential signal,
   transmitting the line sequential signal,
   receiving the line sequential signal, and filtering the chrominance portion of the received line sequential signal to reconstruct a segment of said one chrominance component between samples thereof and to attenuate spatial frequencies of the chrominance portion greater than one-half of said selected submultiple of line frequency, the filtering operation being effective to delay samples of said one chrominance component and bring them into coincidence with the corresponding samples of the luminance component.

2. The method of claim 1, comprising delaying the luminance portion of the first video signal relative to the chrominance portion thereof by an interval equal to the duration of at least three time slots.

3. The method of claim 2 wherein three chrominance component segments, corresponding to second, third and fourth samples of the luminance component, respectively, are reconstructed from respective weighted sums of one sample of said one chrominance component corresponding to a first sample of the luminance component, transmitted ahead of said second, third and fourth samples of the luminance component, two samples of said one chrominance component corresponding to said third sample of said luminance component, transmitted ahead of said fourth sample of the luminance component, and one sample of said one chrominance component corresponding to a fifth sample of said luminance component, transmitted ahead of said fourth luminance component sample.

4. The method of claim 3 wherein said reconstructed segments are produced from a weighted sum of said chrominance component samples.

5. The method of claim 1, wherein the line sequential signal has a succession of time slots each containing a portion representing a luminance component and a portion representing a chrominance component and the chrominance portions in alternate time slots represent spatial samples of first and second chrominance components respectively, each at one-half of line frequency, and the step of filtering said chrominance portion after it has been received includes reconstructing both a segment of the first chrominance component between consecutive samples of the first chrominance component and a segment of the second chrominance component between consecutive samples of the second chrominance component, without attenuating spatial frequencies of the luminance component, and the reconstructed segment of the first chrominance component is produced from a weighted sum of at least a first sample of the first chrominance component corresponding to a first sample of the luminance component and a second sample of the first chrominance component corresponding to a third sample of the luminance component, and the reconstructed segment of the second chrominance component is produced from a weighted sum of at least a first sample of the second chrominance component corresponding to a second sample of the luminance component and a second sample of the second chrominance component corresponding to a fourth sample of the luminance component, the first and second samples of the first chrominance component being transmitted in time slots that are ahead of the time slots containing the first and third samples respectively of the luminance component and the first and second samples of the second chrominance component being transmitted in time slots that are ahead of the time slots containing the second and fourth samples respectively of the luminance component, and the step of filtering the chrominance portion after it has been received has the effect of delaying the samples of the first and second chrominance components without delaying the samples of the luminance component so as to bring the first and second samples of the first chrominance component into time coincidence with the first and third samples of the luminance component and to bring the first and second samples of the second chrominance component into time coincidence with the second and fourth samples of the luminance component, and to achieve time coincidence between the reconstructed segments of the first and second chrominance components and the second and third samples respectively of the luminance component.

6. The method of claim 1 wherein said reconstructed segment is produced from a weighted sum of at least one sample of said one chrominance component corresponding to a first sample of the luminance component, transmitted ahead of a second sample of the luminance component to which said reconstructed segment corresponds, and at least one sample of said one chrominance component corresponding to a third sample of the luminance component, transmitting at the latest simultaneously with said second sample of the luminance component.

7. The method of claim 6 wherein said reconstructed segment is produced from the average of said sample of said one chrominance component corresponding to said first luminance component sample and said sample of said one chrominance component corresponding to said third luminance component sample.

8. The method of claim 1 wherein said reconstructed chrominance component segment is produced from a weighted sum of at least two spatially separated samples of said one chrominance component.

9. The method of claim 8 wherein said reconstructed chrominance component segment is produced from the average of said two spatially separated samples of said one chrominance component.

10. The method of claim 1 wherein a first set of at least two samples of said one chrominance component are spatially separated from one another in a first dimension and a second set of at least two samples of said one chrominance component are spatially separated from one another in a second dimension, alternate sets of samples in each dimension being spatially separated from one another, and wherein at least two spatially separated samples from each said set defining an enclosed area are employed to reconstruct chrominance component segments spatially disposed within said enclosed area.

11. The method of claim 1 wherein said reconstructed segment is produced from a weighted sum of at least one sample of said one chrominance component corresponding to a first sample of the luminance component and transmitted at the latest simultaneously with a second sample of the luminance component, and one sample of said one chrominance component corresponding to a third sample of the luminance component and transmitted at the latest simultaneously with a fourth sample of the luminance component, said reconstructed segment corresponding to said fourth sample of the luminance component and said first sample of the luminance component being transmitted between the second and fourth samples of the luminance component.

12. A transmission and receiving system for television, comprising:
 (a) means for receiving a first video signal having a luminance component and at least one chrominance component and generating and transmitting a second video signal in line sequential chroma format, the line sequential signal having a luminance portion representing spatial samples of the luminance component at line frequency and a chrominance portion representing spatial samples of said one chrominance component at a selected submultiple of line frequency, the chrominance portion having been filtered to attenuate spatial frequencies greater than one-half the frequency of spatial sampling and the luminance portion having been delayed relative to the chrominance portion, whereby samples of the chrominance component occur in the line sequential signal ahead of corresponding samples of the luminance component; and
 (b) receiver means for receiving the line sequential signal and generating a third video signal, the receiver means comprising means for filtering the chrominance portion of the received line sequential signal to reconstruct a segment of said one chrominance component between samples thereof and to attenuate spatial frequencies of the chrominance portion greater than one-half the frequency of spatial sampling, the filtering means being effective to delay samples of said one chrominance component and bring them into coincidence with the corresponding samples of the luminance component.

13. The system of claim 12, wherein the receiver means reconstruct the segment of said one chrominance component by producing a weighted sum of at least two spatially separated samples of said one chrominance component, the receiver means also comprising switch means for selecting the weighted sum and a sample of the luminance component that occurs between said two spatially separated samples of said one chrominance component.

14. The system of claim 12 wherein said filter means comprises delay line means, having an input responsive to said chrominance portion of said line sequential signal and at least one output, for introducing predetermined delay between the occurrence of said chrominance portion at said input and the occurrence of said chrominance portion at each said output, and adder means responsive to said input and at least one said output for adding weighted amounts thereof to produce said weighted sum.

15. The system of claim 14 wherein said receiver means comprises switch means for alternately selecting from among outputs of said delay line means and said adder means.

16. The system of claim 12 wherein said chrominance portion of said signal is compressed in time, said system further comprising expansion means.

17. A method of processing an input video signal having a sample of a luminance component and corresponding samples of first and second chrominance components in each of a succession of time slots corresponding to successive lines of a scanning raster, comprising filtering each chrominance component to attenuate spatial frequencies greater than one-quarter of the spatial frequency of the raster lines by forming a weighted sum of $(n+1)$ consecutive samples of the chrominance component, where n is an even number, delaying the luminance component relative to the chrominance component by a time equal to the duration of at least n+1 time slots, and multiplexing the luminance component of the video signal with the filtered first chrominance component and the filtered second chrominance component in alternating fashion at line frequency, so as to produce a video signal in line sequential chroma format, transmitting the line sequential video signal, receiving the transmitted signal, separating the luminance component of the line sequential video signal from the chrominance components thereof, and filtering the chrominance components of the line sequential video signal to attenuate spatial frequencies greater than one-quarter of the spatial frequency of the raster lines and to reconstruct the filtered first chrominance component during time slots of the line sequential video signal into which the filtered second chrominance component was multiplexed.

18. A method according to claim 17, wherein the luminance component of the first video signal is multiplexed with the filtered first chrominance component during odd-numbered time slots and the filtered second chrominance component during even-numbered time slots, and the filtered first chrominance component during the pth time slot (where p is an even number) is reconstructed by interpolating among the samples of the filtered first chrominance component that occurred during the (p∓j)th time slots, where j is an odd number in the range from 1 to J, and the step of generating the second video signal includes delaying the luminance component of the first video signal relative to the chrominance components thereof by a time equal to the duration of at least J time slots, so that each of the samples of the filtered first chrominance component of the second video signal that contributes to reconstruction of the filtered first chrominance component during the pth time slot occurs in the second video signal before the luminance component for the pth time slot.

19. Apparatus for processing an input video signal having a sample of a luminance component and corresponding samples of first and second chrominance components in each of a succession of time slots corresponding to successive lines of a scanning raster, comprising
  (a) filter means for filtering each chrominance component to attenuate spatial frequencies of the chrominance components greater than one quarter of the spatial frequency of the raster lines without attenuating the spatial frequencies of the luminance component, by forming a weighted sum of (n+1) consecutive samples of the first chrominance component and a weighted sum of (n+1) consecutive samples of the second chrominance component, where n is an even number,
  (b) delay means for delaying the luminance component relative to the chrominance component by a time equal to the duration of at least n+1 time slots,
  (c) multiplexing means for multiplexing the delayed luminance component of the input video signal with the filtered first chrominance component and the filtered second chrominance component in alternating fashion at line frequency, whereby a video signal in line sequential chroma format is produced,
  (d) means for separating the delayed luminance component of the line sequential video signal from the chrominance components thereof, and
  (e) means for filtering the chrominance components of the line sequential video signal to attenuate spatial frequencies greater than one-quarter of the spatial frequency of the raster lines and to reconstruct the filtered first chrominance component during time slots of the line sequential video signal into which the filtered second chrominance component was multiplexed.

20. Apparatus according to claim 19, wherein the multiplexing means multiplex the luminance component with the filtered first chrominance component during odd-numbered time slots and with the filtered second chrominance component during even-numbered time slots, and the means for filtering the chrominance component of the line sequential signal reconstruct the filtered first chrominance component during the pth time slot (where p is an even number) by interpolating among the samples of the filtered first chrominance component that occurred during the (p∓j)th time slots, where j is an odd number in the range from 1 to J, and the delay means delay the luminance component of the input video signal relative to the chrominance components thereof by a time equal to the duration of at least J time slots, so that each of the samples of the filtered first chrominance component of the line sequential signal that contributes to reconstruction of the filtered first chrominance component during the pth time slot occurs in the line sequential signal before the luminance component for the pth time slot.

21. A method of operating a television transmitting and receiving system, comprising generating a first video signal having a luminance component and first and second chrominance components in a succession of time slots of substantially equal duration, corresponding to successive lines of a scanning raster, whereby the portions of each component that occur during each time slot represent samples of the respective components at the spatial frequency of the raster lines, generating a second video signal having a luminance portion and a chrominance portion from the first video signal by filtering the chrominance components of the first video signal to attenuate spatial frequencies greater than one-quarter of the spatial frequency of the raster lines, delaying the luminance component of the first video signal relative to the chrominance components thereof by a time equal to the duration of at least one time slot, and multiplexing the delayed luminance component of the first signal with the filtered first chrominance component and the filtered second chrominance in alternating fashion at line frequency, so that the second video signal is in line sequential chroma format, transmitting the second video signal, receiving the second video signal, and generating a third video signal from the received second video signal by filtering the chrominance portion to attenuate spatial frequencies greater than one-quarter of the spatial frequency of the raster lines and to reconstruct the filtered first chrominance component during time slots of the second video signal into which the filtered second chrominance component was multiplexed.

22. A method according to claim 21, wherein the luminance component of the first video signal is multiplexed with the filtered first chrominance component during odd-numbered time slots and with the filtered second chrominance component during even-numbered time slots, and the filtered first chrominance component during the pth time slot (where p is an even number) is reconstructed by interpolating among the samples of the filtered first chrominance component that occurred during the (p∓j)th time slots, where j is an odd number in the range from 1 to J, and the step of generating the second video signal includes delaying the luminance component of the first video signal relative to the chrominance components thereof by a time equal to the duration of at least J time slots, so that each of the samples of the filtered first chrominance component of the second video signal that contributes to reconstuction of the filtered first chrominance component during the pth time slot occurs in the second video signal before the luminance component for the pth time slot.

23. A method according to claim 21, wherein the operation of filtering the chrominance portion of the third video signal reconstructs the filtered second chrominance component during time slots of the second video signal into which the filtered chrominance component was multiplexed, and the method also comprises bringing the luminance component and the filtered first and second chrominance components into synchronous relationship.

24. A method according to claim 22, wherein the operation of filtering the first chrominance component of the first video signal is carried out by forming a weighted sum of (n+1) consecutive samples of the first chrominance component, where n is an even number.

25. A method according to claim 24, wherein the operation of filtering the second chrominance component of the first video signal is carried out by forming a weighted sum of (n+1) consecutive samples of the second chrominance component, and the operation of filtering the chrominance portion of the third video signal reconstructs the filtered second chrominance component during the (p+1)th time slot by interpolating among the samples of the filtered second chrominance component that occurred during the (p+1∓J)th time slots.

26. A method according to claim 25, wherein the step of generating the second video signal includes delaying the luminance component of the first video signal by an interval equal to the duration of (n+2J)/2 time slots.

27. A method according to claim 26, wherein the third video signal has a luminance component that is of substantially the same bandwidth as the luminance component of the first video signal.

28. A method according to claim 25, wherein the third video signal has a luminance component that is of substantially the same bandwidth as the luminance component of the first video signal.

29. A method of processing an input video signal having a luminance portion representing spatial samples at line frequency of a luminance component and a chrominance portion representing spatial samples at line frequency of at least one chrominance component, the luminance samples occurring in a succession of time slots and the chrominance samples occurring in the same time slots as corresponding luminance samples, the method comprising the following operations:
(a) generating a video signal in line sequential chroma format and having a luminance portion and a chrominance portion, by filtering the chrominance portion of the input video signal to attenuate spatial frequencies greater than one-half of a selected submultiple of line frequency, selecting samples of said one chrominance component at said selected submultiple of line frequency, and multiplexing the selected chrominance samples with the luminance samples, so that samples of said one chrominance component other than the selected chrominance samples are omitted from the line sequential signal,
(b) impressing the line sequential signal on a medium,
(c) extracting the line sequential signal from the medium, and generating a third video signal from the extracted line sequential signal by filtering the chrominance portion of the extracted line sequential signal to reconstruct a segment of said one chrominance component between samples thereof and to attenuate spatial frequencies of the chrominance portion greater than one-half of said selected submultiple of line frequency, the filtering in operations (a) and (c) being effective to delay samples of said one chrominance component, and at least one of operations (a) and (c) including the step of delaying the luminance portion of the video signal that is operated on so that samples of said one chrominance component of the third video signal coincide with the corresponding samples of the luminance component.

30. A system for processing an input video signal having a luminance component and at least one chrominance component, comprising:
(a) means for receiving the input video signal and generating a second video signal in line sequential chroma format, the line sequential signal having a luminance portion representing spatial samples of the luminance component at line frequency and a chrominance portion representing spatial samples of said one chrominance component at a selected submultiple of line frequency, the chrominance portion having been filtered to attenuate spatial frequencies greater than one-half the frequency of spatial sampling;
(b) means for impressing the line sequential signal on a medium; and
(c) means for extracting the line sequential signal from the medium and generating a third video signal by filtering the chrominance portion of the extracted line sequential signal to reconstruct a segment of said one chrominance component between samples thereof and to attenuate spatial frequencies of the chrominance portion greater than one-half the frequency of spatial sampling, the means for generating the second video signal and the means for generating the third video signal being effective to delay samples of said one chrominance component during filtering of the chrominance portion, and at least one of the means for generating the second video signal and the means for generating the third video signal including means for delaying the luminance portion of the video signal so that the samples of said one chrominance component of the third video signal coincide with the corresponding samples of the luminance component.

* * * * *